US011470778B2

(12) United States Patent
Carey

(10) Patent No.: US 11,470,778 B2
(45) Date of Patent: Oct. 18, 2022

(54) LAWNMOWER ACCESSORY MOUNT FOR TRIMMER AND METHODS OF USE THEREOF

(71) Applicant: Russell Mark Carey, Bowman, GA (US)

(72) Inventor: Russell Mark Carey, Bowman, GA (US)

( * ) Notice: Subject to any disclaimer, the term of this patent is extended or adjusted under 35 U.S.C. 154(b) by 299 days.

(21) Appl. No.: 16/252,312

(22) Filed: Jan. 18, 2019

(65) Prior Publication Data

US 2019/0223377 A1 Jul. 25, 2019

Related U.S. Application Data

(60) Provisional application No. 62/619,539, filed on Jan. 19, 2018.

(51) Int. Cl.
| | | |
|---|---|---|
| *A01D 43/16* | (2006.01) | |
| *A01D 34/416* | (2006.01) | |
| *A01D 67/00* | (2006.01) | |
| *A01D 101/00* | (2006.01) | |

(52) U.S. Cl.
CPC ......... *A01D 43/16* (2013.01); *A01D 34/4165* (2013.01); *A01D 67/005* (2013.01)

(58) Field of Classification Search
CPC .. A01D 34/4165; A01D 43/16; A01D 67/005; A01D 75/006; A01D 75/008; A01D 2101/00; A01D 34/84; A01D 34/86; A01D 34/866
USPC ................................................ D15/7, 28, 17
See application file for complete search history.

(56) References Cited

U.S. PATENT DOCUMENTS

| | | | | | |
|---|---|---|---|---|---|
| 2,821,056 | A | * | 1/1958 | Cole ...................... | A01D 43/16 56/17.1 |
| 4,152,882 | A | * | 5/1979 | Howard ............... | A01D 34/001 464/52 |
| 4,170,099 | A | * | 10/1979 | Owens ................... | A01D 43/16 56/12.7 |
| 4,182,100 | A | * | 1/1980 | Letter .................. | A01D 34/416 172/17 |
| 4,442,659 | A | * | 4/1984 | Enbusk .................. | A01G 3/062 280/47.24 |
| 4,453,372 | A | * | 6/1984 | Remer ................... | A01D 43/16 56/11.6 |
| 4,531,350 | A | * | 7/1985 | Huthmacher ........ | A01D 34/416 172/17 |
| 4,922,694 | A | * | 5/1990 | Emoto ................. | A01D 34/001 172/17 |

(Continued)

*Primary Examiner* — Thomas B Will
*Assistant Examiner* — Joan D Misa
(74) *Attorney, Agent, or Firm* — Matthew L. Grell; Grell & Watson Patent Attorneys LLC

(57) ABSTRACT

A mower and an attachment device or mount having a frame attachment clamp to removeably affix to the wheel support frame, a pivotable linkage arrangement to position a string trimmer proximate either front wheel of the lawnmower, and a grade wheel to maintain a designated height of string trimmer above grade. The attachment device or mount may enable the operator to attach the frame attachment clamp to either front wheel enabling the operator to look ahead and anticipate where the lawnmower needs to be driven and simultaneously to position the string trimmer for trimming and edging operation around landscapes and borders on either the left or right side of the lawnmower.

14 Claims, 4 Drawing Sheets

(56) References Cited

U.S. PATENT DOCUMENTS

| | | | |
|---|---|---|---|
| 5,048,276 A | 9/1991 | Miller | |
| 5,065,566 A * | 11/1991 | Gates | A01D 34/866 56/12.7 |
| 5,226,284 A | 7/1993 | Meehleder | |
| 5,303,532 A * | 4/1994 | Phillips | A01D 34/863 56/12.7 |
| 5,598,689 A * | 2/1997 | Bork | A01D 43/16 56/13.7 |
| 5,626,006 A * | 5/1997 | Fricke, Sr. | A01D 34/001 30/276 |
| 5,694,752 A * | 12/1997 | Warfield, III | A01B 59/046 56/13.6 |
| 5,802,824 A | 9/1998 | Aldrich | |
| 5,829,236 A * | 11/1998 | Ballard | A01D 34/001 56/16.7 |
| 5,992,811 A * | 11/1999 | McFerren | A01D 34/001 248/113 |
| 6,032,443 A | 3/2000 | Aldrich | |
| 6,094,896 A | 8/2000 | Lane | |
| 6,343,461 B1 * | 2/2002 | Knott | A01D 43/16 56/11.6 |
| 6,397,572 B1 | 6/2002 | Roundy et al. | |
| 6,430,906 B1 | 8/2002 | Eddy | |
| 6,487,838 B2 | 12/2002 | Handlin | |
| 6,546,706 B1 | 4/2003 | Nafziger | |
| 6,601,374 B2 * | 8/2003 | Smith | A01D 43/16 56/12.7 |
| 6,786,030 B2 * | 9/2004 | Nafziger | A01D 43/16 56/12.7 |
| 6,966,168 B1 * | 11/2005 | Kerr, Sr. | A01D 34/001 56/12.7 |
| 6,986,238 B1 * | 1/2006 | Bloodworth | A01D 34/82 56/12.7 |
| 7,059,107 B2 * | 6/2006 | Pulvirenti | A01G 20/40 56/13.7 |
| 7,219,488 B2 | 5/2007 | Hatfield | |
| 7,360,350 B1 * | 4/2008 | Smith, Jr. | A01D 34/001 56/12.7 |
| 7,690,177 B2 | 4/2010 | Spitzley | |
| 7,712,293 B1 | 5/2010 | Recker | |
| D616,904 S * | 6/2010 | Armstrong | D15/17 |
| 7,823,370 B1 * | 11/2010 | Wiebe | A01D 34/90 56/12.7 |
| 7,975,459 B1 | 7/2011 | Murawski | |
| 8,046,980 B1 | 11/2011 | Schroeck | |
| D661,320 S * | 6/2012 | Armstrong | D15/17 |
| 8,322,121 B1 * | 12/2012 | Marcell | A01D 34/84 56/13.6 |
| 8,464,504 B1 * | 6/2013 | Huff | A01D 43/16 56/12.7 |
| 8,973,343 B2 * | 3/2015 | Bell | A01D 34/66 56/13.7 |
| 9,510,506 B2 * | 12/2016 | Castelli | A01D 34/4165 |
| 9,820,435 B2 * | 11/2017 | Hofmeister | A01D 34/84 |
| 10,660,269 B2 * | 5/2020 | Pendleton | A01D 34/001 |
| 10,772,259 B2 * | 9/2020 | Parker | F16M 11/2014 |
| 10,791,669 B2 * | 10/2020 | Dretzka | B60R 11/06 |
| 10,966,370 B1 * | 4/2021 | Clark | A01D 34/64 |
| 2002/0174638 A1 * | 11/2002 | Borgesen | A01D 34/863 56/14.9 |
| 2004/0154277 A1 * | 8/2004 | Shumate | A01D 34/84 56/12.7 |
| 2004/0237491 A1 * | 12/2004 | Heighton | A01D 34/416 56/12.7 |
| 2005/0193699 A1 | 9/2005 | Hatfield | |
| 2007/0193240 A1 * | 8/2007 | Nafziger | A01D 34/416 56/13.7 |
| 2010/0000192 A1 * | 1/2010 | Robison | A01D 34/84 56/10.2 R |
| 2010/0223897 A1 * | 9/2010 | Mills | A01D 34/416 56/12.7 |
| 2010/0288985 A1 * | 11/2010 | Steensma | A01D 75/008 254/131 |
| 2014/0338299 A1 * | 11/2014 | Lowery | A01D 34/84 56/12.7 |
| 2015/0040529 A1 * | 2/2015 | Standridge | A01D 34/84 56/13.7 |
| 2015/0101302 A1 | 4/2015 | Cooper | |
| 2018/0368314 A1 * | 12/2018 | Parsons | A01D 34/66 |
| 2019/0223377 A1 * | 7/2019 | Carey | A01D 67/005 |

\* cited by examiner

LAWNMOWER ACCESSORY MOUNT FOR TRIMMER AND METHODS OF USE THEREOF

CROSS-REFERENCE TO RELATED APPLICATIONS

To the full extent permitted by law, the present United States Non-provisional Patent Application hereby claims priority to and the full benefit of, U.S. Provisional Application No. 62/619,539, filed on Jan. 18, 2018, entitled "Mower Deck with Attachable String Trimmer and Methods of Use", which is incorporated by reference herein in its entirety.

FIELD OF THE DISCLOSURE

The present disclosure relates to lawn equipment and methods of use thereof. More specifically, the present disclosure is directed to an accessory mount for attaching a string trimmer to front end of a lawn mower, such as a zero turn mower.

BACKGROUND

Various approaches have been utilized for incorporating components on a lawnmower to enable the operator to perform aerating, dethatching, trimming, and edging operations around landscapes and borders while mowing the yard. Most homeowners have a separate string trimmer for trimming operations are needed in areas inaccessible to a lawnmower. Other approaches have concluded it would be desirable to integrate the existing string trimmer to provide trimming and mowing capabilities at the same time. One previous approach provides a mount assembly for mounting a conventional string trimmer device to the mower deck of a riding mower and includes an adjustable mounting state attached to a tube of the string trimmer and having a stake. The apparatus includes a hole, passageway, or hollow tube attached to the mower deck for securing the stake thereto. One disadvantage or drawback to this approach is that the string trimmer is attached to the middle side of the lawnmower and is not in the same operator view as the front wheel while operating a trimming and edging operation around landscapes and borders. This causes the operator to look ahead and anticipate where the lawnmower needs to be driven and secondly looking down to one side to the position of the of string trimmer to see if it is in the proper location rather than being able to view both at the same time and makes accurate positioning of the string trimmer difficult.

Another previous approach provides a mount assembly for mounting a conventional string trimmer device to the backend rear portion of the lawnmower. The mount assembly includes a mounting plate and a post where a series of pivot members attached to the backend rear portion of the lawnmower to allow an operator to swivel the string trimmer device to both sides of the rear of the lawnmower. One disadvantage or drawback to this approach is that the string trimmer is attached to the middle side of the lawnmower and is not in the same operator view as the front wheel while operating a trimming and edging operation around landscapes and borders. This causes the operator to look ahead and anticipate where the lawnmower needs to be driven and secondly looking down to one side to the position of the of string trimmer to see if it is in the proper location rather than being able to view both at the same time and makes accurate positioning of the string trimmer difficult.

Therefore, it is readily apparent that there is a need for a lawnmower accessory to mount a string trimmer in front of and to one side of lawnmower, such as a zero turn mower that functions to enable a combination of features including simple, durable, and relatively inexpensive to manufacture and maintain, ease of assembly, and safe operation. The instant disclosure is designed to address at least certain aspects of the problems or needs discussed above by enabling the operator to look ahead and anticipate where the lawnmower needs to be driven and simultaneously to position the string trimmer for trimming and edging operation around landscapes and borders. The instant disclosure is additionally designed to prevent the operator from having to look down to one side of the lawnmower to position the of string trimmer, to see if it is in the proper location, and thus remove their sight from lawnmower's direction of travel, and thus, prevent accidents and improve operator safety of the lawnmower by keeping the operator looking forward or ahead rather than down alongside the lawnmower.

SUMMARY

Briefly described, in an example embodiment, the present disclosure may overcome the above-mentioned disadvantages and may meet the recognized need for a lawnmower, such as a zero turn mower and an attachment device or mount having a frame attachment clamp to removeably affix to the wheel support frame, a pivotable linkage arrangement to position a string trimmer proximate either front wheel of the lawnmower, and a grade wheel to maintain a designated height of string trimmer above grade. The attachment device or mount may enable the operator to attach the frame attachment clamp to either front wheel enabling the operator to look ahead and anticipate where the lawnmower needs to be driven and simultaneously to position the string trimmer for trimming and edging operation around landscapes and borders on either the left or right side of the lawnmower.

Accordingly, in one aspect, the present disclosure may include a foot pedal mounted to a footrest of the lawnmower where the foot pedal may operate (push and pull) a flexible cable connected to the throttle assembly of the string trimmer to decelerate or accelerate the velocity or revolutions per minute of the string trimmer to match or accommodate plant density and lawnmower speeds.

Accordingly, in another aspect, the present disclosure may include quick connects or the like to enable quick and easy release and attachment of frame attachment clamp to the wheel support frame and quick and easy release and attachment of string trimmer to attachment device or mount.

Accordingly, in still another aspect, the present disclosure may a string trimmer exhaust diverter to divert string trimmer exhaust away from the operator of the lawnmower.

In an exemplary embodiment of the lawnmower, attachment device or mount, string trimmer and methods of use thereof may include a clamp, the clamp having one or more set screws to affix the clamp to the wheel support frame, a horizontal member having a first horizontal member end and a second horizontal member end, the first horizontal member end hingedly connected to the clamp, a string trimmer wheel connected proximate the second horizontal member end to support the second horizontal member end, one or more vertical support extensions having a first vertical support end and a second vertical support end, the first vertical support end connected to the horizontal member and the second vertical support end releasably connected to the string trimmer to cantilever the string trimmer therefrom the wheel support frame of the mower.

In another exemplary embodiment of lawnmower attachment device or mount and methods of use thereof may include the steps of providing a mower with at least one wheel support frame, providing a string trimmer with a string trimmer head and trimmer extension rod, providing a mount assembly having a clamp, the clamp having one or more set screws, a horizontal member having a first horizontal member end and a second horizontal member end, the first horizontal member end hingedly connected to the clamp via a hinge assembly, a string trimmer wheel connected proximate the second horizontal member end to support the second horizontal member end, one or more vertical support extensions having a first vertical support end and a second vertical support end, the first vertical support end connected to the horizontal member affixing the clamp to the wheel support frame, connecting the string trimmer to the second vertical support end to cantilever the string trimmer therefrom the wheel support frame of the mower.

A feature of the lawnmower attachment device or mount for a string trimmer and methods of use thereof may include its ability to enable an operator to perform hands free operation of a string trimmer while driving a lawnmower.

Another feature of the lawnmower attachment device or mount for a string trimmer and methods of use thereof may be ability to perform hands free operation of a string trimmer while driving a lawnmower while seated in the lawn tractor.

Another feature of the lawnmower attachment device or mount for a string trimmer and methods of use thereof may be the ability to provide a linkage arrangement that allows the string trimmer to be moved or positioned from side-to-side and up and down independent of the lawnmower.

Another feature of the lawnmower attachment device or mount for a string trimmer and methods of use thereof may be the ability to provide a linkage arrangement that includes a frame clamp, linear member or tubes, pivot mechanisms, base, grade wheel, and quick connects or clamps to position string trimmer adjacent either of lawnmowers front wheels.

Another feature of the lawnmower attachment device or mount for a string trimmer and methods of use thereof is its ability to provide time-savings by preventing the lawnmower operator from make multiple or additional trips around the lawn to trim edges and borders after having mowed the lawn.

Another feature of the lawnmower attachment device or mount for a string trimmer and methods of use thereof is its ability to provide a universal left or right front wheel attachment and to position the string trimmer at various desired positions or distances away from left or right front wheel.

Another feature of the lawnmower attachment device or mount for a string trimmer and methods of use thereof is its ability to provide string trimming only, mowing only or combination string trimming and mowing.

Another feature of the lawnmower attachment device or mount for a string trimmer and methods of use thereof is its ability to provide mower deck with an attachable string trimmer.

Another feature of the lawnmower attachment device or mount for a string trimmer and methods of use thereof is its ability to enable manipulation by the users hand while in the seated position and may have foot controls as well.

These and other features of the lawnmower attachment device or mount for a string trimmer and methods of use thereof will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The present lawnmower attachment device or mount for a string trimmer and methods of use will be better understood by reading the Detailed Description of the Preferred and Selected Alternate Embodiments with reference to the accompanying drawing Figures, in which like reference numerals denote similar structure and refer to like elements throughout, and in which.

Figure 1:
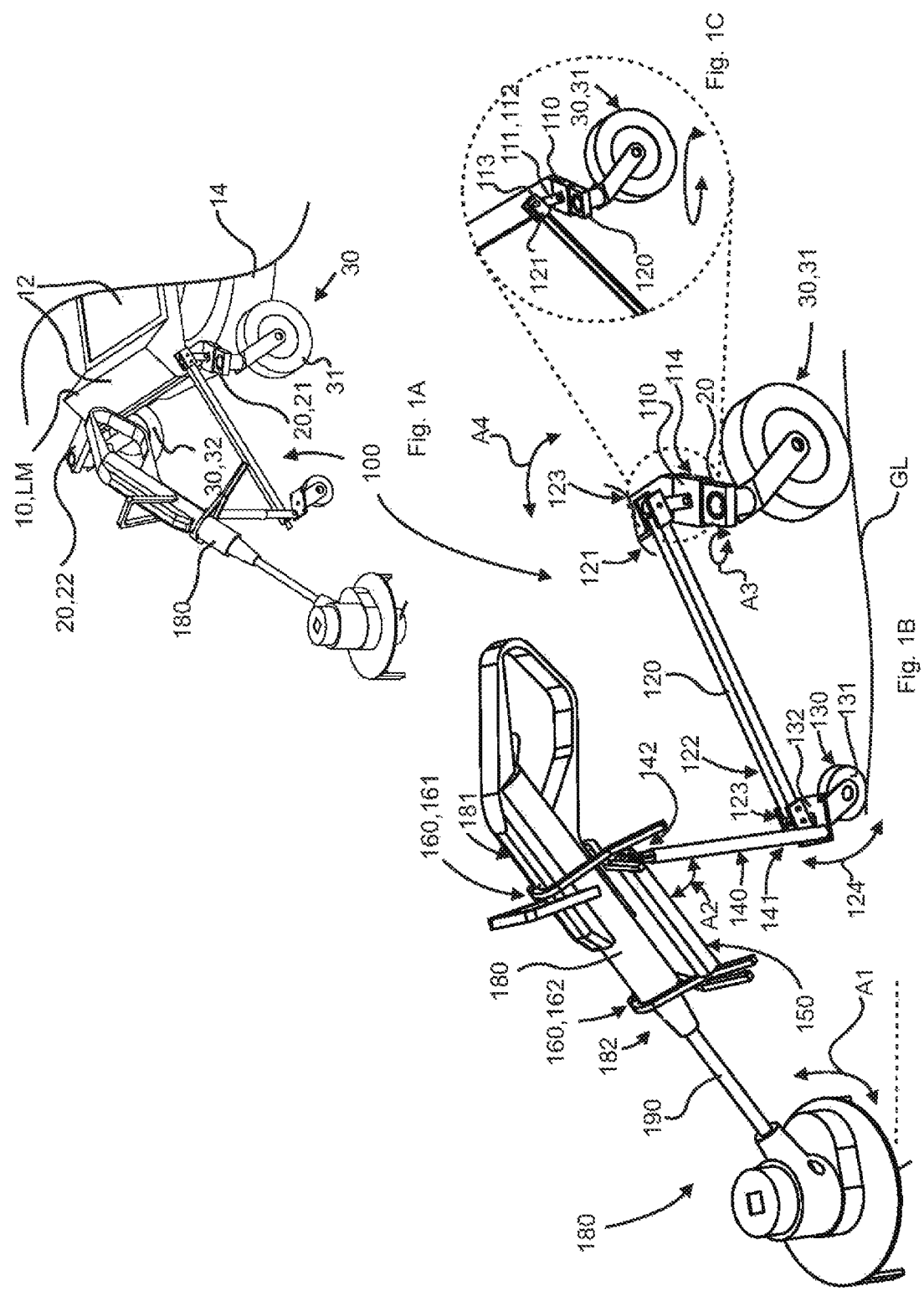
FIG. 1A is a perspective view of the front of a lawnmower with front wheels and an attachment device or mount for a string trimmer according to select embodiments of the instant disclosure.
FIG. 1B is a perspective view of the attachment device or mount for a string trimmer according to select embodiments of the instant disclosure.
FIG. 1C is an exploded view of the attachment device or mount for a string trimmer showing the mount thereto lawnmower with front wheel according to select embodiments of the instant disclosure.
Figure 2:
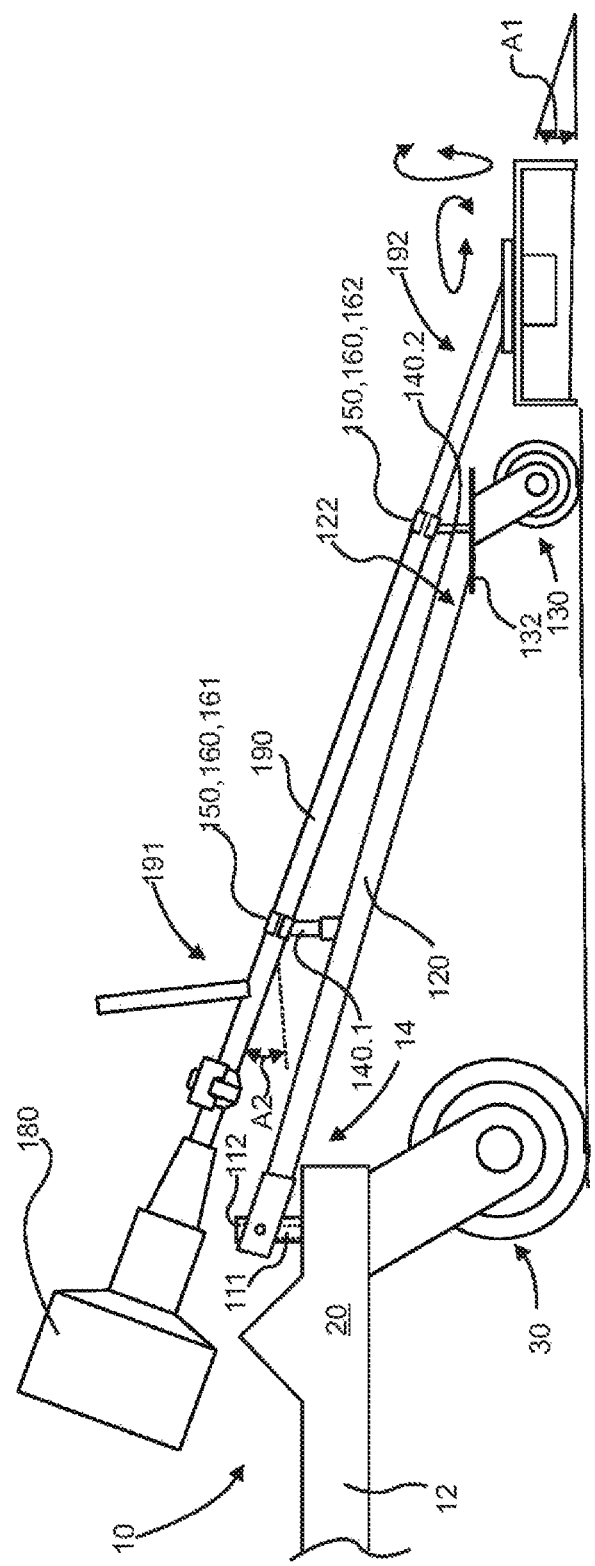
FIG. 2 is a side view of an alternate attachment device or mount for a string trimmer according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present disclosure, as illustrated in FIGS. 1A, 1B, 1C, 2, 3 and 4 specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1A, 1B, 1C, and 2A by way of example, and not limitation, there is illustrated an example embodiment of a front section or portion 10 of a lawn tractor, preferably a riding lawnmower, such as a zero turn lawnmower LM. Lawnmower front section 10 may include a deck, such as foot rest 12 for providing a flat platform to stand while mounting lawnmower LM and a place to position feet while seated on lawnmower LM. Deck, such as foot rest 12 may preferably support an under carriage, such as mower deck 14 housing a rotating mower blade (not shown). Mower deck 14 may include a hingeable discharge flap, such as discharge chute 16 hingedly connected thereto mower deck 14. Moreover, mower deck 14 may include one or more forward positioned frame extensions 20, such as left or first front frame extension 21 and right or second front frame extension 22, whereby first front frame extension 21 may include a left or first swivel caster and wheel assembly 30, such as left or first swivel caster wheel 31 and a right or second swivel caster and wheel assembly 30, such as right or second swivel caster wheel 32. It is contemplated herein that one or more forward positioned frame extensions 20 may be configured as square tube, rounded tube, angle or channel iron, aluminum or the like.

Furthermore, lawnmower LM may include an accessory attachment or assembly, such as string trimmer mount assembly 100. String trimmer mount assembly 100 may include a frame attachment device, such as mounting 110 configured to removeably attach or affix thereto one or more forward positioned frame extensions, such as wheel support frame 20 for wheel assembly 30. Mount 110 may be configured to fit or conform to the shape of one or more forward positioned wheel support frame 20 whether square tube, rounded tube, angle or channel iron or the like. For example, mount 110 may in a preferred embodiment be configured as a U-shaped clamp having a set screw 114 to removeably attach or affix mounting clamp 110 to one or more forward positioned wheel support frame 20. Mount 110 may further include an extension, mount, or stub, such as vertical post 111 formed integral thereto mount 110. It is contemplated herein that first vertical post 111 may be bolted, welded or otherwise bonded thereto wheel support frame 20 or wheel assembly 30. Moreover, mount 110 may further include a tubular extension, such as collar 112 configured with a similar but larger cross section or diameter so as to be connected, adapted to receive, slide over, and encompass vertical post 111 to enable removeability, pivot, and/or swivel, such as rotation A3 therebetween or thereabout stationary vertical post 111 and removeable second vertical mount extension 112. A locking pin and key or bolt and nut assembly or the like, such as attachment device 113 may be utilized to connect or affix vertical post first vertical mount extension 111 and second vertical mount extension 112. It is contemplated herein that other removeable attachment mechanisms may be incorporated between stationary mount, such as vertical post 111 and removeable or detachable mount, such as second vertical mount extension 112. String trimmer mount assembly 100 is preferably removeably connected there lawnmower LM when second vertical mount extension 112 is slipped over or removeably connected thereto vertical post 111. A locking pin and key, bolt and nut assembly, set screw or the like, such as attachment device 114 may be utilized to secure, connect, or affix mounting clamp 110 to one or more forward positioned wheel support frame 20.

String trimmer mount assembly 100 may further include a horizontal extension or linkage, such as horizontal member 120 having first horizontal member end 121 and second horizontal member end 122. First horizontal member end 121 may be hingedly or pivotably and/or removeably affixed to mounting clamp 110 or more specifically to vertical post 111 or most specifically to second vertical mount extension 112 via swivel, pivotable connector or the like. First horizontal member end 121 may include a pronged end or two piece tongue to hingedly engage (a pivot mechanism or connector, such as first hinge assembly 123) mounting clamp 110 or more specifically to vertical post 111 or most specifically to second vertical mount extension 112 via insertion of a pin and key or bolt and nut assembly or the like, such as attachment device 114 therebetween more specifically to vertical post 111 or most specifically to second vertical mount extension 112. Moreover, hinge assembly 123 may be configured to enable second horizontal member end 122 to travel, float up (raised) and down (lowered), or move up and down, relative thereto first horizontal member end 121, mounting clamp 110, and vertical post 111, such as in pivoting along arc or direction 124 and capable of traversing terrain, such as ground line GL. Furthermore, hinge assembly 123 may be configured to enable first horizontal member 120 to fold or hinge (movement in direction A4) between an up position or non-engaged mode of operation of string trimmer (non-operational trimmer position) where lawnmower LM may mow or travel, or a down position or engaged string trimmer mode of operation where string trimmer 180 is operational (operational trimmer position, shown in FIGS. 1 and 2) while lawnmower LM may mows or performs edging operations around landscapes and borders (edge operation).

Still further, hinge assembly 123 may be configured to enable second horizontal member end 122 may be configured to travel, float up and down, or move up and down, relative thereto first horizontal member end 121, mounting clamp 110, and vertical post 111, such as in pivoting along arc or direction 124 and capable of traversing terrain, such as ground line GL.

Second horizontal member end 122 may have attached thereto string trimmer wheel assembly 130, such as grade wheel 131 to support second horizontal member end 122, provide horizontal stability for string trimmer 180, and to enable string trimmer 180 to traverse ground line GL similar thereto a first swivel caster wheel 31 (a designated height for string trimmer 180). String trimmer wheel assembly 130 may include a plate, such as platform 132 affixed thereto second horizontal member end 122 to provide additional area to attach or removeably attach grade wheel 131 thereto platform 132 via weld, screw, bolt and nut, assembly or the like.

Furthermore, vertical support extension end 142 may be affixed to a string trimmer extension or cradle, such as string trimmer base 150 affixed thereto second vertical support extension end 141.2 and positioned with an angle, such as base angle A2 similar thereto (approximately equal) an angle, such as trimmer angle A1 between string trimmer and trimmer extension rod 190 of string trimmer 180. String trimmer 180 may be clamped, affixed, or removeably affixed thereto string trimmer base 150 by one or more attachment clasps or devices, such as one or more string trimmer clasps 160 capable of clamping, gripping, clasping, or removeably attaching thereto string trimmer 180.

Alternatively, second vertical support extension end 142 may include a molded base, such as string trimmer base 150 capable of receiving and clamping, clasping, gripping, or removeably attaching thereto string trimmer 180. String trimmer base 150 may include first string trimmer clasp 161 and second string trimmer clasp 162 capable of clamping, gripping, or removeably attaching thereto first attachment point 181 and second attachment point 182 thereon string trimmer 180.

Furthermore, string trimmer mount assembly 100 may include one or more vertical extensions or linkages, such as vertical support extensions 140 extending therefrom horizontal member 120 or platform 132. More specifically, one or more vertical support extensions 140 may include first vertical support extension 140.1 affixed or removeably affixed proximate thereto first horizontal member end 121. Moreover, second vertical support extension 140.2 may be affixed proximate thereto second horizontal member end 122 or more specifically affixed to platform 132. Furthermore, first vertical support extension 140.1 and second horizontal member end 140.2 may include string trimmer clasps 160 capable of clamping, gripping, clasping, or removeably attaching thereto string trimmer 180, and more specifically first vertical support extension 140.1 and second horizontal member end 140.2 may affix thereto string trimmer extension rod 190, proximate first string trimmer extension rod end 191 and second string trimmer extension rod end 192, respectively.

Alternatively, first vertical support extension 140.1 and second horizontal member end 140.2 may include a molded base, such as string trimmer base 150 capable of receiving and clamping, clasping, gripping, or removeably attaching thereto string trimmer extension rod 190. String trimmer base 150 may include first string trimmer clasp 161 and second string trimmer clasp 162 capable of clamping, gripping, or removeably attaching thereto string trimmer extension rod 190, proximate first string trimmer extension rod end 191 and second string trimmer extension rod end 192, respectively and positioned with base angle A2 similar thereto angle A1 of string trimmer 180.

Figure 3:
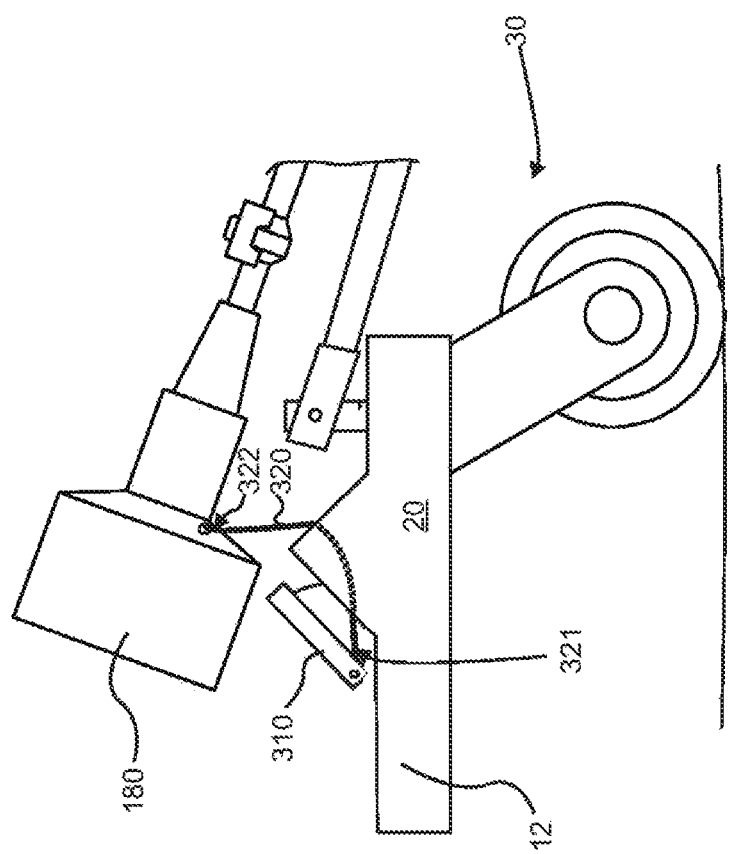
FIG. 3 is a side view of the front of a lawnmower with front wheels shown with foot pedal and throttle cable therebetween according to select embodiments of the instant disclosure.

Referring now to FIG. 3 by way of example, and not limitation, there is illustrated an example embodiment of a front section or portion 10 of a lawn tractor, preferably a riding lawnmower, such as a zero turn lawnmower LM, string trimmer mount assembly 100, and string trimmer 180. String trimmer mount assembly 100 may include throttle cable 320 having first throttle cable end 321 and second throttle cable end 322. Moreover, string trimmer mount assembly 100 may include throttle pedal 310 positioned thereon lawnmower LM, and more specifically proximate foot rest 12 or alternatively affixed thereto foot rest 12.

Figure 4:
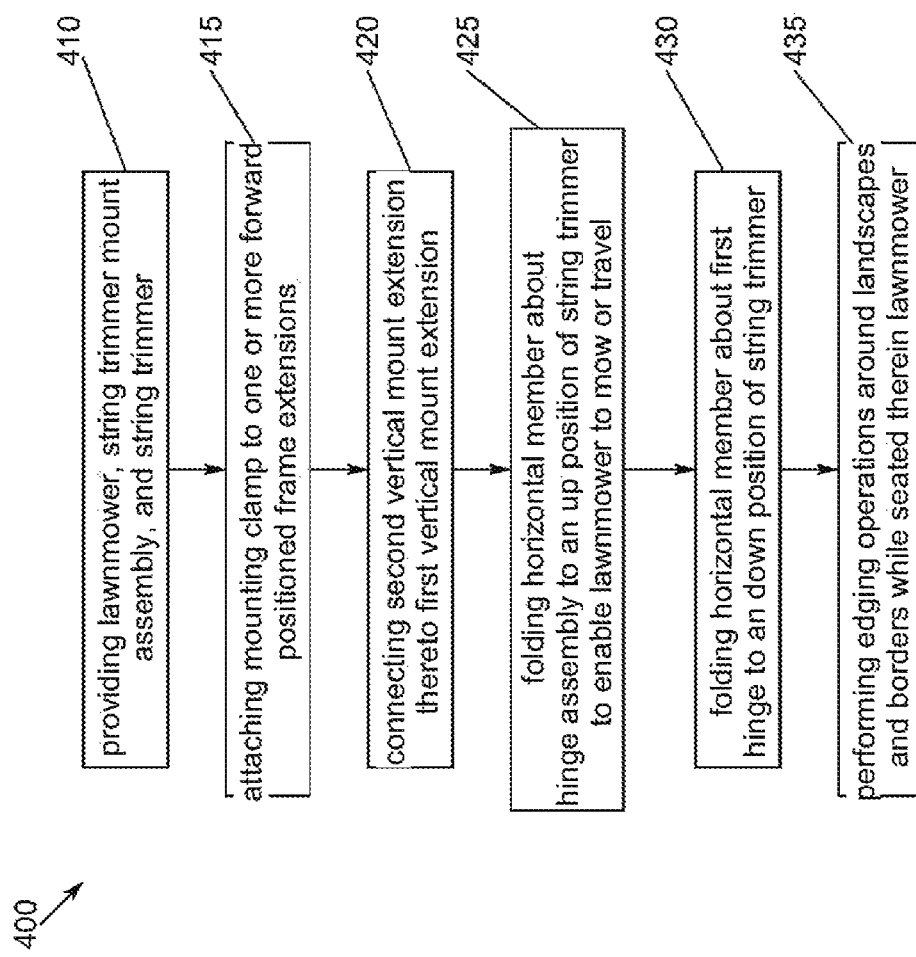
FIG. 4 is a flow diagram of a method of installation and use of a lawnmower, string trimmer mount assembly, and string trimmer according to select embodiments of the instant disclosure.

Referring now to FIG. 4, there is illustrated a flow diagram 400 of a method of use of an exemplary embodiment of lawnmower LM, string trimmer mount assembly 100, and string trimmer 180. In block or step 410, providing lawnmower LM, string trimmer mount assembly 100, and string trimmer 180 as set forth in any of the embodiments discussed herein, and/or shown in FIGS. 1-3. In block or step 415 attaching mounting clamp 110 to one or more forward positioned wheel support frame 20. In block or step 420 connecting second vertical mount extension 112 thereto vertical post 111. In block or step 425 folding horizontal member 120 (movement in direction A4) about first hinge assembly 123 to an up position (raised), non-engaged, non-operational mode of operation of string trimmer to enable lawnmower LM mow or travel thereabout. In block or step 430 folding first horizontal member 120 (movement in direction A4) about first hinge assembly 123 to a down position (lowered), engaged, or operational string trimmer mode of operation where string trimmer 180 is operational while lawnmower LM may mows or traverses. In block or step 435 performing edging operations (trim grass outside of mower wheel path) around landscapes and borders moving or traverse across ground line GL while seated therein lawnmower LM.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein but is limited only by the following claims.

The invention claimed is:

1. A mount assembly to affix a string trimmer with a string trimmer head and a trimmer extension rod to a mower deck moving across a ground line, said mount assembly comprising:
   a zero turn mower having a mower wheel assembly with a wheel frame extension to support a mower wheel;
   a frame attachment device, said frame attachment device is configured to affix to said wheel frame extension of said mower wheel;
   a horizontal member having a first horizontal member end and a second horizontal member end, said first horizontal member end hingedly connected to said frame attachment device of said mower wheel assembly, and a platform affixed to said second horizontal member end;
   a string trimmer wheel connected to said platform to support said second horizontal member end and said platform relative to said ground line; and
   an elongated vertical support extension having a first vertical support end and a second vertical support end, said first vertical support end hingedly connected to said platform and said second vertical support end releasably connected to the string trimmer to cantilever the string trimmer from said string trimmer wheel;
   wherein said elongated vertical support extension directly hinged from said horizontal member;
   wherein said first vertical support end hingedly connected to said platform pivots the string trimmer between a non-operational trimmer position and an operational trimmer position.

2. The mount assembly of claim 1, wherein said second vertical support end further comprises a string trimmer cradle to receive the string trimmer.

3. The mount assembly of claim 2, wherein said string trimmer cradle is positioned at a base angle relative to said vertical support extension and approximately equal to a string trimmer angle between the string trimmer head and the ground line.

4. The mount assembly of claim 3, further comprising one or more string trimmer clasps attached to said string trimmer cradle and configured to affix the string trimmer to said string trimmer cradle.

5. The mount assembly of claim 1, wherein said frame attachment device is configured as a U-shaped clamp.

6. The mount assembly of claim 1, wherein said frame attachment devicefurther comprises a vertical post formed integral thereto and said first horizontal member end further comprises a collar hingedly connected thereto.

7. The mount assembly of claim 6, wherein said collar is removeably affixed to said vertical post to connect the mount assembly to the mower.

8. The mount assembly of claim 1, wherein said first horizontal member end is connected to said frame attachment device vertical post by a hinge assembly.

9. The mount assembly of claim 8, wherein said hinge assembly enables said string trimmer wheel to traverse the ground line.

10. The mount assembly of claim 8, wherein said string trimmer wheel and said hinge assembly maintains the string trimmer head a designated height above the ground line.

11. A method of edging landscapes borders while seated, said method comprising the steps of:
    providing a zero turn mower having a mower wheel assembly with at least one wheel frame extension to support a mower wheel moving across a ground line;
    providing a string trimmer with a string trimmer head and a trimmer extension rod;
    providing a mount assembly having a frame attachment device, said frame attachment device is configured to affix to said at least one wheel frame extension of said mower wheel assembly,
    a horizontal member having a first horizontal member end and a second horizontal member end, said first horizontal member end hingedly connected to said frame attachment device of said mount assembly and a platform affixed to said second horizontal member end, a string trimmer wheel connected to said platform to support said second horizontal member end and said platform relative to said ground line, an elongated vertical support extensions having a first vertical support end and a second vertical support end, said first vertical support end hingedly connected to said platform; and
    connecting said string trimmer to said second vertical support end to cantilever the string trimmer therefrom said string trimmer wheel, wherein said elongated vertical support extension directly hinged from said horizontal member, wherein said first vertical support end hingedly connected to said platform pivots the string trimmer between a non-operational trimmer position and an operational trimmer position.

12. The method of claim 11, folding said vertical support extension to an up position to enable said mower and said string trimmer to travel thereabout.

13. The method of claim 11, folding said vertical support extension to a down position to perform an edge operation.

14. The method of claim 13, edging landscapes while seated thereon said mower.

* * * * *